Figure 1:
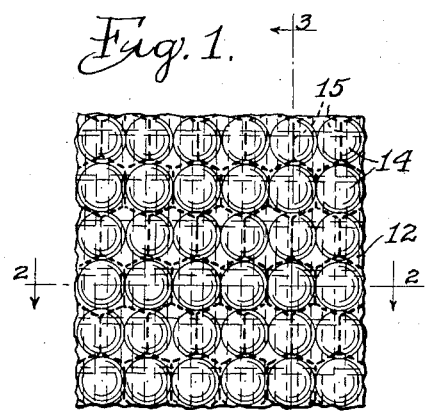

Jan. 16, 1934.                H. W. WELD                1,943,995
                           GLASS CONSTRUCTION
                         Filed April 3, 1930          2 Sheets-Sheet 1

INVENTOR
HERBERT W. WELD
BY Albert C. Bell
ATTORNEY

Jan. 16, 1934.  H. W. WELD  1,943,995
GLASS CONSTRUCTION
Filed April 3, 1930  2 Sheets-Sheet 2

INVENTOR
HERBERT W. WELD
BY Albert E. Bell
ATTORNEY

Patented Jan. 16, 1934

1,943,995

UNITED STATES PATENT OFFICE 1,943,995

GLASS CONSTRUCTION

Herbert W. Weld, Chicago, Ill.

Application April 3, 1930. Serial No. 441,253

12 Claims. (Cl. 49—92)

My invention consists of an improved construction of light transmitting glass and the method of making the same, by which a plurality of thicknesses of glass having different refractive indices, may be provided with projections and depressions on their adjacent surfaces and joined by fusion during the manufacture of the glass, to constitute a single thickness. The projections and depressions on the adjacent surfaces of the thicknesses or layers of the glass, may be made in any convenient manner, for example by molds, dies or rollers, and the resulting glass construction may have any desired form, for example flat sheets, curved sheets, bowls, globes, or any other conformation adapted to receive light from any source whether natural or artificial, and transmit the light with desired refraction or diffusion, or both, to meet the requirements of any form of lighting.

In the past, diffusion partition glass has been produced, by providing on one or both of the opposite surfaces of sheet glass, projections and depressions, or patterns of one kind or another, to produce the desired diffusion. Partition glass of this kind has usually been open to the objection that the external projections and depressions catch the dirt, and it is difficult to keep the glass in the clean condition required to permit it to effectively transmit light through it. My invention as applied to partition glass of this kind, may, if desired, completely avoid this difficulty, by making the partition glass of a plurality of layers of different refractive indices, having projections and depressions on their adjacent surfaces and joined by fusion during the making of the glass. The result is sheet glass which may be smooth on both of its external surfaces, and yet have desired diffusion properties resulting from the internal projections and depressions referred to. Furthermore, the said projections and depressions may be of any form and arrangement that will most effectively meet the requirements in any particular case. Again, the several thicknesses or layers of the resulting product, may be of clear glass or colored glass, or a combination of the two, depending upon the requirements in any particular case. Again, for some purposes, the product made as described, may also be provided on one or both of its external surfaces, with prismatic, lenticular or other refracting conformations, as desired, particularly where the product is required to collect all available light rays, or completely diffuse the same, or both.

My invention also includes the method of producing the composite glass product referred to, which consists of forming a first thickness of glass having a first refractive index, with projections and indentations on its surface according to the effects desired, and then placing upon the first thickness, and in highly heated condition, a second thickness of glass having a different refractive index, so that the second thickness when applied to the first thickness, has a surface conformation the reverse of the first thickness, at the adjacent surfaces of the two thicknesses, and joining the thicknesses by heat, maintaining the said depressions and projections in substantially undisturbed condition. More specifically, my method consists of forming as described, a first thickness of glass having a certain refractive index, then similarly and reversely forming a second thickness of glass having a different refractive index, so that the projections and indentations on one of the adjacent surfaces are the reversed counterpart of the indentations and projections on the other surface, applying the second thickness to the first thickness with its indentations and projections in registry with the projections and indentations on the first thickness, joining the thicknesses by fusion, and, if desired, forming on one or both of the external surfaces of the product, indentations or projections, or both, that may be desired for refraction and diffusion purposes in connection with collecting light rays and transmitting them through and from the glass.

Among the advantages that may be noted for my composite glass construction, are the following: where the product is in the form of partition glass, its external surfaces may be smooth and substantially parallel, making the cleaning of the glass an easy matter, and at the same time, the glass may have any desired refractive properties required to deliver rays into a room in dispersed relation; again, the appearance of partition glass having external surfaces which are smooth, is superior to that of diffusing glass having external diffusing conformations, in that the diffusing surfaces of my glass construction may be internal, and when so, they do not present to an observer, effects of reflection corresponding to the diffusing conformations, since the refracting surfaces are internal and are not therefore polished in the manner that all external surfaces of light transmitting glass are polished to a greater or lesser degree, and the glass presents the appearance of being transparent and clear or colored as the case may be, and smooth, without being able to see through it, even if its layers are of clear and transparent glass; again, where it is desirable that the construction shall collect external light rays from different directions and with maximum efficiency, one external surface of the glass construction may be provided with a conformation most effectively accomplishing that result, the internal structure of the glass may be as described to effect diffusion of the rays passing through the glass, and, if desired, the other external surface of the glass may be provided with a conformation further diffusing the rays emerging from the glass, to the end that any desired diffusion of the rays may be effectively accomplished; again, the thicknesses being of different kinds of glass having interengaging projections and depressions which are joined by fusion, each thickness tends if broken, to break differently than the other thickness, making the glass highly resistant to shattering.

My invention may be embodied in many forms for many uses. For example, for diffusion purposes, the glass may consist of a plurality of thicknesses of glass of the same or different indices of refraction joined by fusion as described, and having small pieces or particles of glass of other kind, or of crystal, or of silica sand or other material spread between said thicknesses; again, the composite glass may consist of external thicknesses of glass of the same or of different indices of refraction joined by fusion as described to a mid-thickness of glass of a different refractive index; again, where said mid-thickness has a relatively high coefficient of expansion, it may be made to crack along many lines during cooling of the product, breaking up its surface into many small parts producing a distinctive appearance and effect; again, where it is important that the composite glass shall be highly resistant to shattering due either to shock or to fire, while reinforcing wire may be used, if desired, even without reinforcing wire, any form of my glass construction strongly tends to maintain its form when cracked by shock, or by heat, or by rapid and uneven heat changes, whether internal projections and indentations are employed or not, since the cracks in one thickness will extend in different directions than the cracks in the adjacent thickness of different refractive index, the fused union of the thicknesses serving to hold the pieces of each thickness in place and making the construction shatter and fire resistant.

Figures 3, 4:
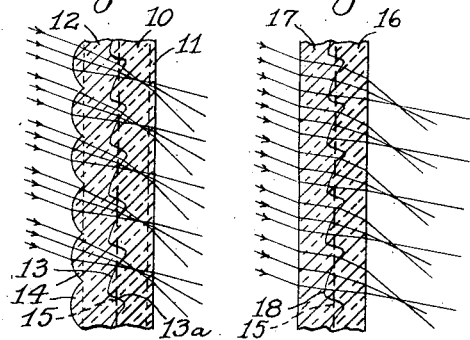
Figure 2:
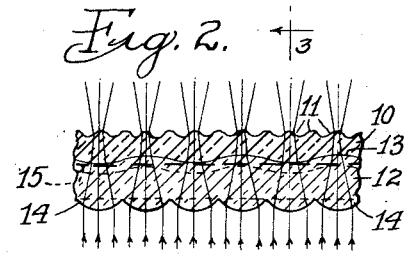
Figure 12:
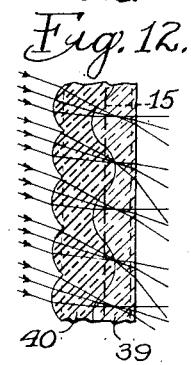
Figure 13:
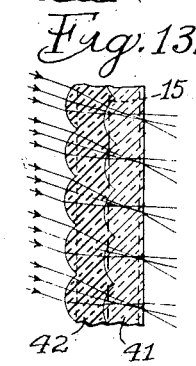
Figure 14:
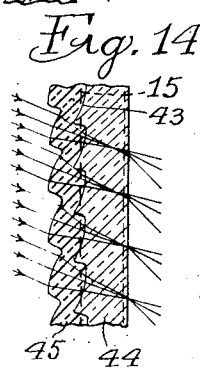
Figure 15:
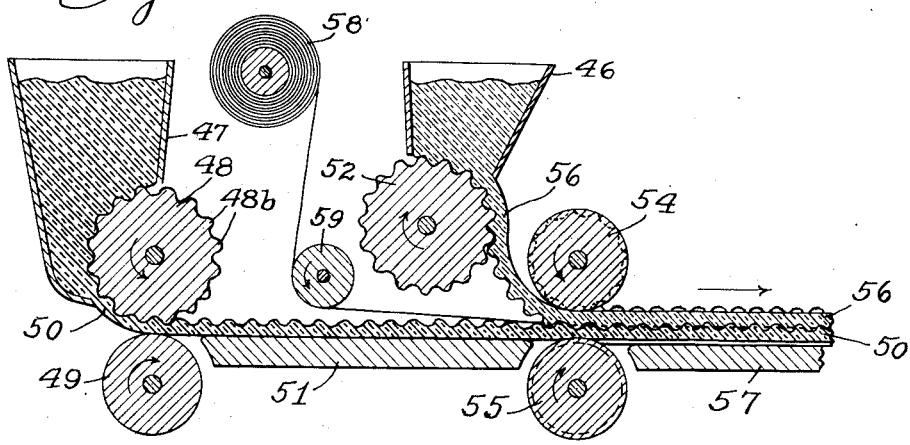
Figure 16:
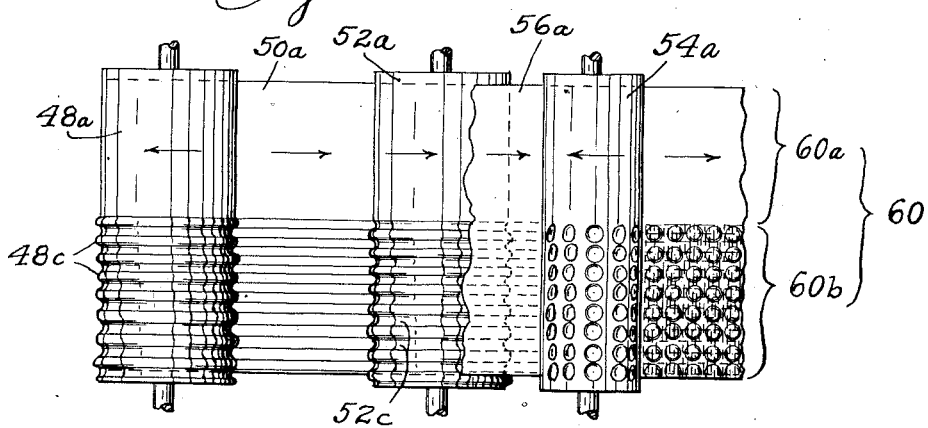

My invention will best be understood by reference to the accompanying drawings showing preferred embodiments thereof, in which Fig. 1 shows in elevation, a sheet of glass in accordance with my invention, having a refractive conformation on each of its external surfaces, Fig. 2 is a horizontal sectional view of the construction shown in Fig. 1, taken along the line 2—2, Fig. 3 is a vertical sectional view of the construction shown in Fig. 1, taken along the line 3—3, Fig. 4 shows in a view similar to Fig. 2, the same form of internal construction with the external refractive conformations omitted, Figs. 5–9 inclusive show in views similar to Fig. 3, different forms of internal surfaces of the thicknesses forming the sheet glass, and different forms of external refractive conformations, Figs. 10–13 inclusive show in views similar to Fig. 3, forms of the kind illustrated in Figs. 3–6 inclusive, the difference in each case being that the relation of the relatively dense and light layers of the glass is the reverse of that shown in Figs. 3–6 inclusive, Fig. 14 shows in a view similar to Fig. 3, a still different arrangement of internal and external refracting conformations, with the same relation of relatively dense and light layers illustrated in Figs. 10–13 inclusive, Fig. 15 illustrates diagrammatically in longitudinal, vertical, sectional view a form of machine that may be used to make my improved glass construction in sheet form, Fig. 16 illustrates diagrammatically in plan view a modified form of machine having the general operation of the machine illustrated in Fig. 15, and Figs. 17–20 inclusive show in views similar to Fig. 3, further modified constructions in accordance with my invention.

Similar numerals refer to similar parts throughout the several views.

As more clearly shown in Fig. 2, the sheet glass illustrated in Figs. 1, 2 and 3 consists of a relatively dense layer of glass 10 having an external surface provided with parallel prismatic or cylindrical lens elements 11 of relatively small pitch and depth, so related that alternate ones are convex lens elements and intermediate ones are concave lens elements. These lens elements may have any prismatic or curved form which will disperse the rays laterally on their emerging from the glass. A second layer of relatively light weight glass 12 is joined by fusion to the layer 10, on the surface indicated at 13, which surface of junction is preferably undulating laterally of the sheet of glass illustrated in Figs. 1 and 2, to correspondingly refract light rays laterally that pass through the glass. The layer 12 has a relatively small refractive index and the layer 10 has a relatively large refractive index, and since the amount of the refractive index usually varies with the density of the glass, for convenience, the layers of glass are referred to as light and dense glass respectively. As illustrated in Fig. 3, the surface of junction 13, is shown as consisting of a plurality of horizontally extending prismatic or cylindrical lens elements which are convex projections from the dense layer 10, and similar and oppositely formed concave depressions in the light layer 12, these lens elements being preferably inclined to a vertical plane to more effectively refract light rays entering the glass obliquely, than would be the case if the lens elements were vertically disposed, the edges of the lens elements being connected by substantially plane portions 13a preferably inclined slightly to horizontal planes. The layer 12 is preferably provided on its outer surface with lenticular projections 14, which as shown in Figs. 1, 2 and 3 consist of spherical convex lens elements, as illustrative of any type of lenticular or refracting surfaces that may be formed on the outer surface of the layer 12, to effectively collect light rays and project them into and through the sheet of glass.

In making the sheet glass described, one or the other of the layers, for example the layer 10 is formed by any suitable means for example, molds, dies or rollers, so that the projections shown at 13 are formed on one of its surfaces, and while the layer 10 is still hot enough to adhere to additional glass that may be placed upon it, the layer 12 of light glass is placed upon it so that it makes contact with the entire surface of the layer 10, along what becomes the surface of junction 13 between the two layers. The layer 12 is sufficiently hot to be plastic when it is applied to the layer 10, and the result is a fusing together of the adjacent surfaces of the layers without appreciable change in the form of the projections extending from the layer 10 into the layer 12. The layer 12 may if desired, be sufficiently fluid when applied to the layer 10, so that it readily conforms to the shape of the surface of the layer 10, or if preferred, the layer 12 may have indentations formed in its surface which are the reversed counterpart of the projections on the layer 10, after which the layer 12 may be applied to the layer 10, with its indentations in registry with the projections on the layer 10, and before the glass has cooled sufficiently to prevent the fusion of the layers together.

The action of the structure described, is illustrated diagrammatically on light rays entering the glass as indicated by the arrows, which are concentrated by the external projections on the layer 12 and further concentrated by the lenticular portions of the surface 13, and refracted by said latter surface through the layer 10 to the ridges or corrugations 11 on the external surface of the layer 10, which further refract the rays to effect dispersion of them as indicated.

Where it is desired that the glass structure shall be as strong mechanically as possible, reinforcing wire 15 is preferably placed in the structure, and this may be conveniently done by placing the wire between the layers 10 and 12 before the layer 12 is pressed against the layer 10, so that the reinforcing wire is embedded in parts of both of the layers 10 and 12.

The glass construction illustrated in Fig. 4 is similar to that shown and described in connection with Figs. 1–3 inclusive, differing therefrom in that the dense layer 16 has a smooth outer surface and that the light layer 17 also has a smooth outer surface, these outer surfaces being illustrated as substantially parallel, the surface of junction 18 being of the same formation as that shown in Fig. 3. This construction is shown to illustrate the action upon parallel light rays entering the glass construction, of the surface of junction of the two layers of the glass, which first concentrates and refracts the rays and then effects their diffusion as indicated.

Figure 5:
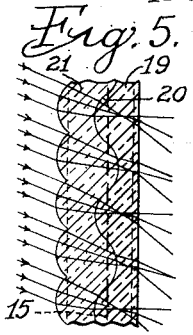

The construction illustrated in Fig. 5, is similar to that shown and described in connection with Figs. 1–3 inclusive, excepting that the dense layer 19 is provided with a surface of junction 20 with the light layer 21, which consists of alternate cylindrical projections extending horizontally of the sheet, joined by similar intermediate cylindrical indentations, as a result of which the layer 21 of the completed glass structure is provided with alternate indentations of cylindrical form connected by intermediate cylindrical projections of the same form. With this construction, the cylindrical projections from the layer 19 concentrate and refract light rays falling upon them, with subsequent diffusion of the rays by the external surface of the layer 19, while the depressions in the layer 19, diffuse the rays without concentration which diffusion is increased by the refraction of the rays from the layer 19.

Figure 6:
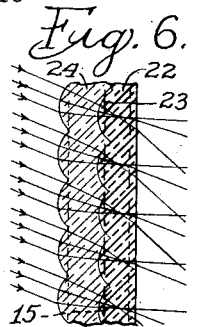

The construction illustrated in Fig. 6 is similar to that shown and described in connection with Figs. 1–3 inclusive, excepting that the dense layer 22 is provided with a surface of junction 23 with the light layer 24, which consists of a plurality of convex lenticular projections joined at their edges, which is similar in effect to arranging the lenticular surfaces of junction shown at 13 in Fig. 3, in vertical arrangement instead of inclined to a vertical plane as shown in Fig. 3, which effects a similar concentration and diffusion of the light rays passing through the glass structure, to that illustrated in Fig. 3, excepting that the rays are finally directed by the glass structure in a different direction relatively to the plane of the glass structure as a whole, on account of the changed inclination of the lenticular elements of the surface of junction.

Figure 7:
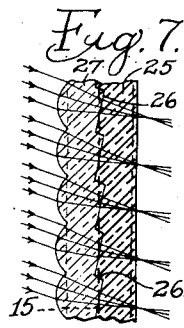

The construction illustrated in Fig. 7 is similar to that shown and described in connection with Figs. 1–3 inclusive, excepting that the dense layer 25 is provided with a surface of junction 26 with the light layer 27, which consists of a plurality of plane surfaces inclined slightly to a vertical plane instead of curvilinear convex surfaces as shown in Fig. 3, joined at their edges by similar plane surfaces 26a inclined slightly to a horizontal plane, the effect of the structure being to refract rays upwardly at the surface of junction, assuming that they are incident to the glass structure as illustrated.

The construction illustrated in Fig. 8 differs from that shown and described in connection with Figs. 1–3 inclusive in that the projections 28 from the outer surface of the light layer 29 are of substantially the conformation of the projections formed on the dense layer 30 along its surface of junction 31, which has the effect of increasing the light collecting power of the glass structure, assuming that the structure is not required to gather light from any considerable angle laterally, but is required to gather light rays from a considerable angle vertically. Where it is desired that the glass structure shall gather light rays through a wide angle in all directions, the lenticular arrangement shown at 14 in Figs. 1, 2 and 3, is found to be best adapted to the purpose.

Figure 9:
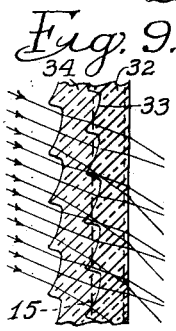

The construction illustrated in Fig. 9, is similar to that shown and described in connection with Figs. 1–3 inclusive excepting that the projections formed on the dense layer 32 at its surface of junction 33 are concave cylindrical elements extending horizontally of the sheet, instead of convex, as illustrated in Fig. 3, and that the external projections from the light layer 34 are similar concave cylindrical elements extending horizontally across the sheet. This structure has the effect of dispersing light rays which are incident upon the external surface of the layer 34, and the surface of junction 33 is effective in further dispersing the light rays as indicated.

Figures 10, 11:

The construction illustrated in Fig. 10 is similar to that shown and described in connection with Figs. 1–3 inclusive, excepting that the relative densities of the structures are reversed, that is to say, the layer 35 is the light layer, and the layer 36 is the dense layer, the layer 36 being assumed to be the one having its external surface presented to the source of light. With this construction, the surface of junction of the layers has the effect of dispersing and refracting the rays passing through it instead of concentrating and refracting them as illustrated in connection with Fig. 3.

The construction illustrated in Fig. 11 is similar to that shown in Fig. 4, the difference being that the densities of the layers is reversed, the layer 37 being the light layer and the layer 38 being the dense layer, the layer 38 being assumed to be the one presented to the source of light. With this construction, the effect of the surface of junction is to disperse the rays passing through it instead of concentrating them as illustrated in connection with Fig. 4.

The construction illustrated in Fig. 12 is similar to that illustrated in Fig. 5, excepting that the densities of the layers is reversed, the layer 39 being the light layer and the layer 40 being the dense layer. With this construction, the effect is similar to that illustrated in connection with Fig. 5, excepting that each of the projections from the light layer 39, disperses rays passing through it and each of the depressions in the light layer 39 concentrates rays passing through it, which is the reverse of the action illustrated in Fig. 5.

The construction illustrated in Fig. 13 is similar to that shown in Fig. 6 excepting that the densities of the layers is reversed, the layer 41 being the light layer and the layer 42 being the dense layer. With this construction, the projections from the layer 41 disperse the rays passing through them, instead of concentrating them as illustrated in Fig. 6.

Figure 8:
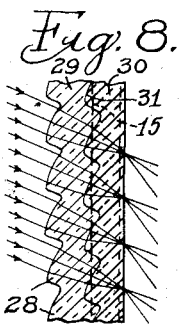

The construction illustrated in Fig. 14 is similar to that shown in Fig. 8 excepting that the densities of the layers are reversed and the surface of junction 43 is provided with concave cylindrical elements projecting from the layer 44 instead of convex cylindrical elements as shown for the layer 30 in Fig. 8. In this construction the light layer is illustrated at 44 and the dense layer at 45. With this construction the effect of the external projections on the dense layer 45 is similar to that produced by the external projections 28 on the layer 29 in Fig. 8 excepting that the refraction is greater, and the effect of the concave projections from the light layer 44, is to further concentrate the rays passing through them, besides refracting them towards the external surface of the layer 44.

Figures 17, 18, 19, 20:
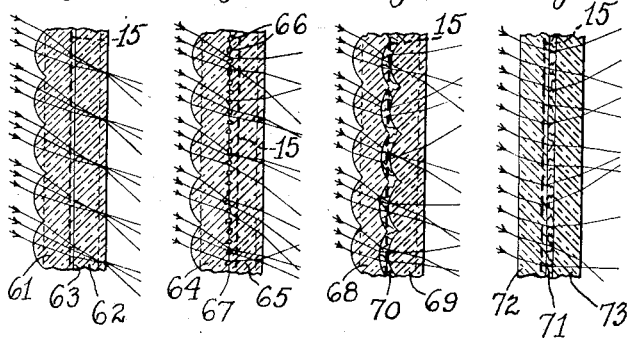

The construction illustrated in Fig. 17 is similar to that shown and described above in connection with Fig. 7, excepting that the surface of junction between the layers is a plane surface, instead of being prismatic as shown in Fig. 7. In the construction of Fig. 17, the light and dense layers are shown at 61 and 62 respectively and their surface of junction at 63. While the diffusing effect of this construction is limited to the effects produced by its external conformations, the joining of the dissimilar glass layers 61 and 62 by fusion, produces a construction which it is difficult to shatter either by blows, shocks, or the action of fire, whether or not the structure is provided with external light-collecting or light-diffusing conformations or both, and whether or not the structure is provided with reinforcing wire. When cracked in any way and by any action, the glass of one layer has cracks produced in it related to each other in a manner characteristic of that kind of glass, and at the same time the glass of the other layer, if cracked, has cracks produced in it related to each other in a different manner characteristic of the other kind of glass of which the other layer is made. As a result the cracks in one layer cross the cracks in the other layer to a considerable extent, and this together with the joining of the layers by fusion, holds the glass structure intact and renders it practically proof against shattering, whether from shock or fire, unless the shock is sufficient to actually demolish the structure. These advantages attach for the same reasons, to all of the glass structures involving my present invention.

The construction illustrated in Fig. 18 is similar to that shown and described in connection with Fig. 17, excepting that in making the structure, before joining the adjacent surfaces of the light and dense layers 64 and 65 respectively, particles 66 of subdivided material are spread on one of said adjacent surfaces so that they are embedded in the surface of junction 67 of the layers. The material employed may be glass of different refractive index from either of the layers 64 and 65, quartz or other crystals, silica sand, or other suitable material to give the desired effect. The particles may be applied in any arrangement desired, and the effect is to render the glass structure obscure to a greater or lesser degree, depending upon the kind and quantity of obscuring material employed, where, as illustrated, the surface of junction is a plane surface, it being understood that similar particles may be similarly applied with any other form of my construction, as desired.

In the construction illustrated in Fig. 19, the light and dense layers of glass 68 and 69 respectively, have disposed between them an intermediate layer of glass 70, which may have a refractive index different from that of either of the layers 68 and 69, or it may have a relatively high coefficient of expansion, or both. As shown, the layer 70 is formed substantially as shown for the surface of junction in Figs. 6 and 13. When the layer 70 is relatively thin and has a coefficient of expansion substantially higher than that of the other layers, after the layers are joined by fusion in making the glass, the cooling of the glass cracks the layer 70 throughout its entire extent without freeing the outer layers from each other, producing many irregularly arranged refracting, reflecting and obscuring surfaces, which disperse the rays passing through the glass in a correspondingly irregular manner.

The construction illustrated in Fig. 20 is similar to that shown in Fig. 19, excepting that the intermediate layer 71 is flat, instead of being provided with refracting projections as shown on the layer 70 in Fig. 19, and no external light-collecting or light-diffusing conformations are employed. In this case, the layer 71 is taken of a coefficient of expansion substantially greater than that of the layers 72 and 73 to which the layer 71 is joined as described in making the glass. The effect on the layer 71 is substantially the same and with substantially the same results as described for the layer 70 in connection with Fig. 19.

With the construction illustrated in Fig. 17, either layer may be the dense layer, and with the construction illustrated in each of Figs. 18, 19 and 20, either external layer may be denser than the other, or both may be of the same kind of glass, since the intermediate material produces substantial diffusion regardless of the action of the external layers.

It will be understood that the several forms of refracting, concentrating and dispersing surfaces, are illustrative of many forms of projections that may be made on one layer or the other of the glass structure on its surface of junction; also that any desired form of projections and depressions may be employed, to refract the light rays at the surface of junction, depending upon the particular result desired to be secured; also, that while external projections are shown on the layers of the glass structure, these may be used or omitted as desired, and furthermore that any desired form of external refracting elements may be employed on one or both of the surfaces of the structure, with any desired form of refracting projections and depressions on the surface of junction of the layers of the structure; also, that the glass employed may be of any kind and either clear or colored, depending upon the requirements of any particular case, the only essential being that the glass shall be of such a nature, and the refracting projections and depressions shall be so arranged as to secure the desired effects at the surface of junction of the layers of the glass; also, that while I have shown the glass structure as consisting of two layers, I do not limit myself to that number of layers in making up any glass structure in accordance with my invention, since the two layers joined by fusion as described, are illustrative of a glass structure generically of the kind described, consisting of a plurality of layers. It will further be understood, that while the several glass constructions described, are illustrated in sheet form, this is done for convenience, and that glass structures in accordance with my invention may be made in flat sheet form or in any other conformation, whether of uniform thickness or not, that is adapted to transmit light rays from any source whether natural or artificial, with desired diffusion and refraction effects. For example, the glass may be formed in flat sheets, in curved sheets, or the sheets may have the form of bowls or globes, depending upon the particular purpose for which the glass structure is to be used in any case.

As illustrative of one means for effecting the operation of my improved method of constructing glass as described, I show in Fig. 15 diagrammatically, a machine consisting of hoppers 46 and 47 for containing in fluid condition, the different kinds of glass employed. The hopper 47 is disposed adjacent a roller 48 which by its rotation in the direction indicated, draws glass from the hopper 47 between it and a roller 49, to form one layer 50 of the glass construction. The roller 48 is formed on its outer surface as indicated at 48b, to produce the particular conformation of projections and indentations which it is desired to have on the inner surface of the completed glass structure, and the roller 49 is preferably smooth and serves to press the glass against the roller 48, to produce the desired arrangement of projections and indentations on the upper surface of the glass layer 50. The layer 50, formed as described, passes on a bed plate 51, below and out of contact with a roller 52 arranged to draw fluid glass from the hopper 46 and pass it in sheet form below the roller 54. The roller 52 is provided on its outer surface with a conformation which is the reverse of that carried by the roller 48, so that the glass layer 56 has formed on its lower surface, projections and indentations which are the counterpart of the indentations and projections on the upper surface of the layer 50, the rollers 54 and 55 serving to press the layers firmly together to join them by fusion due to the layers being still in plastic condition when they pass between the rollers 54 and 55. The several rollers are preferably connected by gearing not shown, so that they have the same rate of peripheral travel, and the angular relation of the rollers 48 and 52 is so arranged, that when the layer 56 is brought into engagement with the layer 50, the projections and indentations on the lower surface of the layer 56 will register with the indentations and projections on the upper surface of the layer 50, as a result of which the layers are joined with a minimum of pressure upon them by the rollers 54 and 55. The glass construction thus formed may be given external projections and depressions in any desired arrangement, by correspondingly forming the outer surfaces of the rollers 54 and 55 to produce the desired conformations on the upper and lower surfaces of the glass construction as it passes between said rollers, and the finished glass construction is delivered to a second bed plate 57 from which it may pass to annealing ovens or lehrs in any desired manner required by the particular kind of glass being handled. If preferred, the roller 52 may have a plain cylindrical outer surface, and the layer 56 may be pressed into the depressions in the upper surface of the layer 50 by the action of the roller 54, particularly where the conformation of the upper surface of the layer 50 is not subject to ready deformation by the pressing of the layer 56 against it. Where it is desired to incorporate reinforcing wire in the glass construction, it may conveniently be done by mounting a roll of the wire as indicated at 58, from which the wire is led around a guide roller 59 just above the lower layer 50, and between the layers 50 and 56 and embedded in the layers adjacent their surface of junction by the action of the rollers 54 and 55. This machine construction provides for glass constructions in which rows of projections and indentations extending transversely of the sheet glass, are formed in the surface of junction of the layers of the glass. In some cases, it is desired that a part of the glass have no dispersing action due to the forming of depressions and projections on the surface of junction of the layers, and in such cases, as illustrated in Fig. 16, the rollers 48a and 52a corresponding with the rollers 48 and 52, are plain cylinders for a part of their length and have conformations on their remaining portions, as indicated at 48c and 52c, for producing the desired projections and indentations on the layers 50a and 56a respectively. In this case I illustrate the projections and depressions as extending longitudinally of the sheet of glass and it is to be noted that with this construction, the rollers 48a and 52a need not be accurately timed as to their relative angular positions to insure registry between the projections and indentations, particularly where the indentations and projections are of uniform cross section throughout the length of the sheet of glass. With this construction, as a result of their being no projections or indentations on parts of the rollers 48a and 52a, the portion 60a of the completed glass construction 60, is clear and without any conformation that will tend to either disperse or concentrate light rays passing through it, while the remaining portion 60b of the completed glass 60 is provided with an internal structure for effecting the refracting of light rays in the manner above described. It will be understood that with either of the machines illustrated in Figs. 15 and 16, the external projections and depressions produced by the rollers 54 and 55 or by the roller 54a and its companion roller, not shown, may be omitted if desired, by using plain pressure rollers.

While I have shown my invention in the particular embodiment above described, it will be understood that I do not limit myself to this exact construction as I may employ equivalents known to the art at the time of the filing of this application without departing from the scope of the appended claims.

What I claim is:

1. A glass construction comprising the combination of a first thickness of glass of a first refractive index, and a second thickness of glass of a different refractive index fused on one of its surfaces to a surface of said first thickness, each of said thicknesses having on its inner surface projections and indentations fitting indentations and projections respectively of the inner surface of the other of said thicknesses, one of said thicknesses having light-gathering conformations on a part of its external surface leaving the remainder of its external surface smooth.

2. A glass construction comprising the combination of a first thickness of glass of a first refractive index, and a second thickness of glass of a different refractive index fused on one of its surfaces to a surface of said first thickness, each of said thicknesses having on its inner surface projections and indentations fitting indentations and projections respectively of the inner surface of the other of said thicknesses, one of said thicknesses having light-diffusing conformations on a part of its external surface leaving the remainder of its external surface smooth.

3. A glass construction comprising the combination of a first thickness of glass of a first refractive index, and a second thickness of glass of a different refractive index fused on one of its surfaces to a surface of said first thickness, each of said thicknesses having on its inner surface projections and indentations fitting indentations and projections respectively of the inner surface of the other of said thicknesses, one of said thicknesses having light-gathering conformations on a part of its external surface leaving the remainder of its external surface smooth and the other of said thicknesses having light-diffusing conformations on part of its external surface leaving the remainder of its external surface smooth, the smooth portions of said external surfaces being opposed to each other.

4. A glass construction comprising the combination of a first thickness of glass of a first refractive index, and a second thickness of glass of a different refractive index fused on one of its surfaces to a surface of said first thickness, each of said thicknesses having on its inner surface projections and indentations fitting indentations and projections respectively of the inner surface of the other of said thicknesses, one of said thicknesses having light-gathering conformations on a part of its external surface leaving the remainder of its external surface smooth and the other of said thicknesses having light-diffusing conformations on part of its external surface leaving the remainder of its external surface smooth, the smooth portions of said external surfaces being opposed to each other, the portion of said inner surface between said smooth portions being free from projections and depressions.

5. Sheet glass for diffusing purposes having lenses on one of its surfaces and alternate ribs and grooves on its other surface, each rib having a convex cylindrical formation and each groove having a concave cylindrical formation, there being a plurality of said ribs in width for each of said lenses.

6. Sheet glass for diffusing purposes having spherical lenses on one of its surfaces and alternate ribs and grooves on its other surface, each rib having a convex cylindrical formation and each groove having a concave cylindrical formation, there being a plurality of said ribs in width for each of said lenses.

7. Sheet glass for diffusing purposes having spherical convex lenses on one of its surfaces and alternate ribs and grooves on its other surface, each rib having a convex cylindrical formation and each groove having a concave cylindrical formation, there being a plurality of said ribs in width for each of said lenses.

8. Sheet glass for diffusing purposes having a diffusing configuration on one of its surfaces extending throughout the length of the sheet and covering part of the width of the sheet, the other part of the width of said surface being plane and unobscured.

9. Sheet glass for diffusing purposes having a diffusing configuration on each of its surfaces extending throughout the length of the sheet and covering part of the width of the sheet, the other part of the width of each of said surfaces being plane and unobscured, the plane and unobscured parts of said surfaces being of substantially the same width as and opposite each other.

10. Sheet glass for diffusing purposes comprising a first thickness of glass of a relatively high coefficient of expansion, and an adjacent thickness of glass on each side of said first thickness and having a substantially lower coefficient of expansion, said thicknesses being joined by fusion in plastic condition, whereby on cooling, said first thickness is in crackled condition.

11. Transparent sheet glass for clear, undistorted and unobstructed vision therethrough, comprising the combination of a first thickness of clear glass having substantially parallel plane surfaces, and a second thickness of clear glass having substantially parallel plane surfaces and having a refraction index substantially different from the refraction index of said first thickness of glass and having one of its plane surfaces joined directly with one of the plane surfaces of said first thickness of glass by fusion, whereby when either of said thicknesses of glass is cracked the other of said thicknesses tends to hold the cracked pieces against shattering and scattering.

12. Transparent sheet glass for clear, undistorted and unobstructed vision therethrough, comprising the combination of a plurality of adjoining thicknesses of clear glass having respectively substantially different densities and each having substantially parallel plane surfaces, the respective adjoining plane surfaces of said thicknesses being joined by fusion, whereby when any of said thicknesses is cracked, the adjoining thickness of glass tends to hold the cracked pieces against shattering and scattering.

HERBERT W. WELD.